Dec. 22, 1953   W. A. MELCHIOR ET AL   2,663,402
BUCKET CONVEYER
Filed Sept. 10, 1949   3 Sheets-Sheet 1
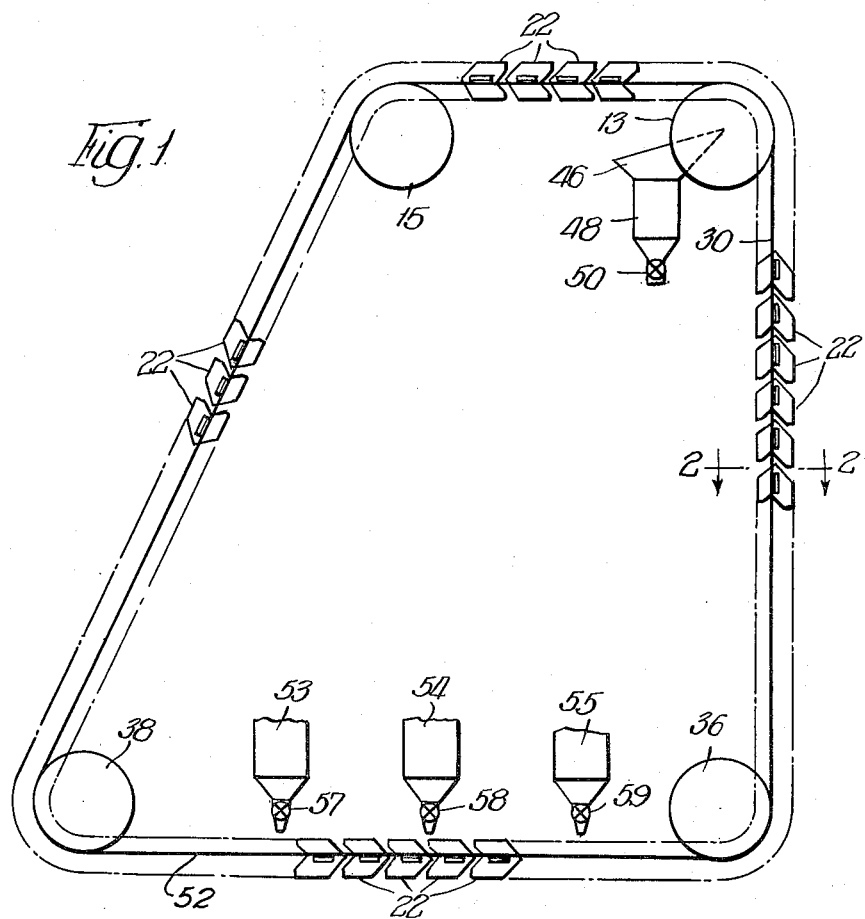
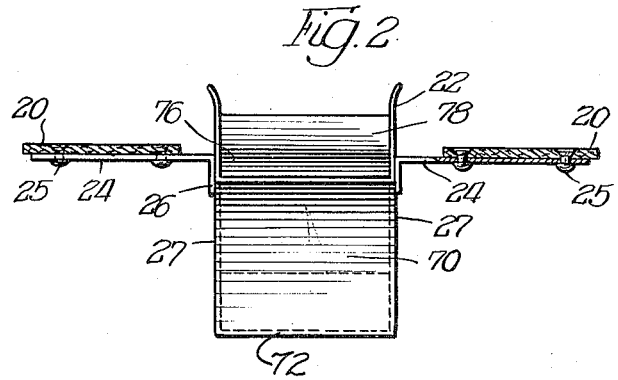
INVENTORS:
Wilhelm A. Melchior,
BY Alan R. Graff,

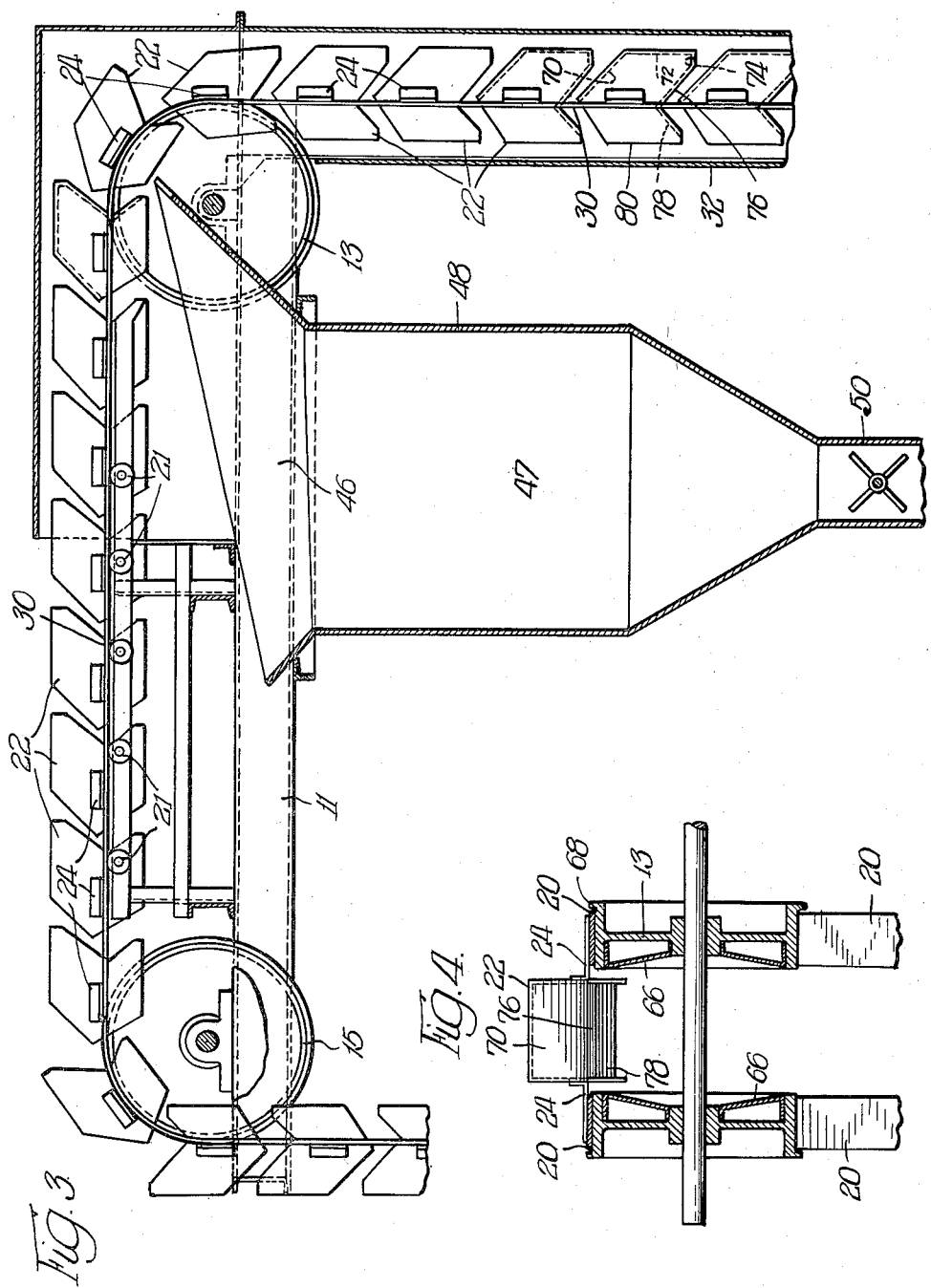

Dec. 22, 1953  W. A. MELCHIOR ET AL  2,663,402
BUCKET CONVEYER
Filed Sept. 10, 1949  3 Sheets-Sheet 3
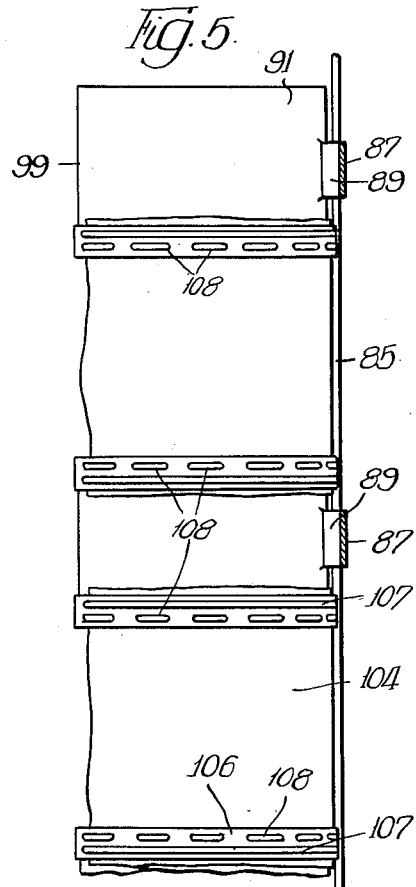
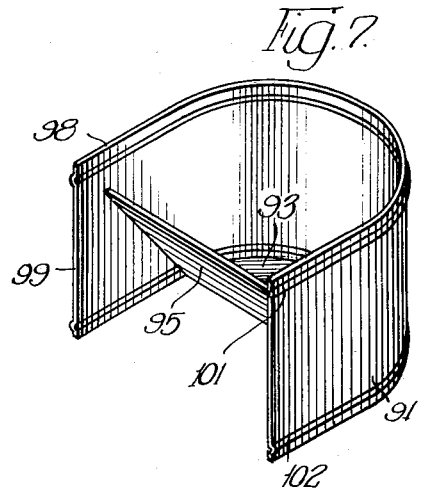
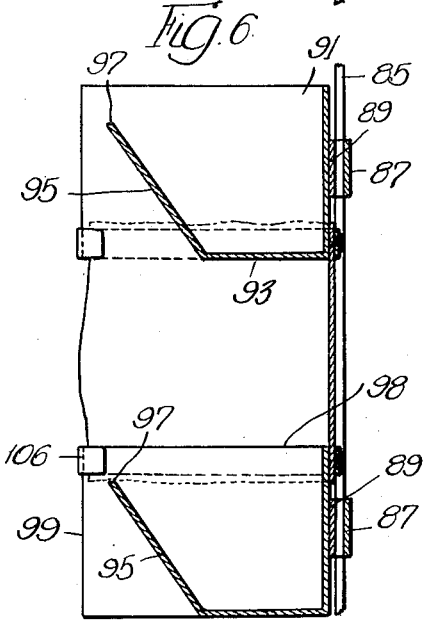
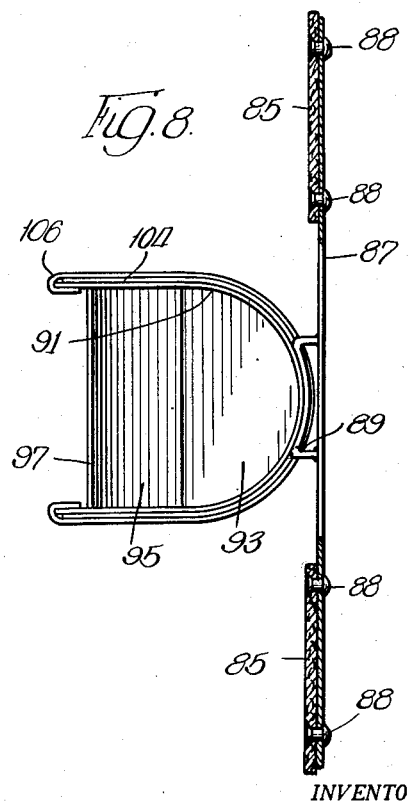
INVENTORS
Wilhelm A. Melchior,
BY Alan R. Graff, Patented Dec. 22, 1953

2,663,402

UNITED STATES PATENT OFFICE 2,663,402

BUCKET CONVEYER

Wilhelm A. Melchior, Wilmette, and Alan R. Graff, Chicago, Ill., assignors to The Columbia Malting Company, Chicago, Ill., a corporation of Illinois Application September 10, 1949, Serial No. 115,002

3 Claims. (Cl. 198—149)

This invention relates to a new and improved conveyor and more particularly to a continuous conveyor of the bucket type.

The conveyor is especially designed for handling small elements or granular material such, for example, as grain or malt, although it may be used for other material within its capacity. In general, when small elements or granular material must be lifted from one level to another and also conveyed some distance horizontally, two or more separate conveying systems have been provided, one or more systems for the horizontal run and another system for the vertical elevation. Commonly a belt or screw conveyor is used for horizontal runs in combination with a bucket conveyor for the vertical run. Such a combination of separate conveyors with transfer from one to another serves to increase breakage and loss of material. It tends, also, to increase the overall height of the building or supporting structure and to unnecessarily complicate the driving and control mechanisms required. A further object to such multiple unit conveyor systems resides in the fire and other hazards incident to failure and choking of one of the conveying units while preceding units remain in operation.

The conveyor of the present invention is free from the above objections and combines extremely gentle handling of the material with high carrying capacity, a minimum of frictional contact of the moving parts and simplicity in construction. While metal buckets are preferably used, they are carried and supported by continuous belts which are formed of non-metallic materials such, for example, as leather, fabric, rubber or various rubber-like synthetic materials with or without fibrous or fabric reinforcement. The metal buckets are so spaced that they do not contact each other and the construction is designed to eliminate creation of sparks which is important when handling certain materials such, for example, as grain or malt.

It is an object of the present invention to provide a new and improved continuous conveyor of the bucket type.

It is a further object to provide a conveyor of this type adapted for both moving material horizontally and elevating, such conveyor being loaded on the upper side of a lower horizontal run and discharging toward the bottom side of an upper horizontal run.

It is an additional object to provide a conveyor having metal buckets supported on non-metallic continuous flexible elements, the buckets being maintained out of contact with each other during the operation of the conveyor.

It is also an object to provide a conveyor of this type in which the buckets are so associated and related on a horizontal run so that the conveyor may be continuously fed with material, with all material entering buckets.

It is another object to provide a conveyor of this type operating over driving and idler pulleys which locate and guide the conveyor without contact with the metal buckets.

Other and further objects will appear as the description proceeds.

We have shown certain preferred embodiments of our invention in the accompanying drawings, in which—

Figure 1 is a somewhat diagrammatic elevation of a conveyor system;

Figure 2 is a section, on an enlarged scale, taken on line 2—2 of Figure 1;

Figure 3 is a view, partly in section, of the upper portion of Figure 1, on an enlarged scale;

Figure 4 is a fragmentary section taken through the conveyor and a supporting pulley;

Figure 5 is a fragmentary side elevation, on an enlarged scale and partly broken away, showing a modified form of conveyor;

Figure 6 is a vertical section through the conveyor of Figure 5;

Figure 7 is a perspective view of one of the buckets of the conveyor of Figure 5; and Figure 8 is a transverse section of the conveyor of Figure 5.

The particular form of installation shown in Figures 1 to 4 inclusive comprises an upper supporting framework, generally indicated at 11, carrying a driven pulley 13 and an idler pulley 15 over which the upper run of the conveyor passes. The driven pulley 13 may be driven by any desired means, the particular form of drive forming no part of the present invention and not being shown. The conveyor comprises a pair of flexible belts 20, best shown in the cross-sectional view of Figures 2 and 4. The upper runs of these belts 20 are supported by spaced rollers 21, as shown in Figure 3. These belts carry the buckets 22 which are provided with permanently connected arms 24 which are secured to the belts 20 by rivets 25. The buckets 22 may be formed of pieces of sheet metal welded together and the arms 24 have downturned flanges 26 which may be welded to the side walls 27 of the buckets.

Referring to Figure 1, the conveyor is shown as having an upwardly moving run 30 which is enclosed in a housing 32. The lower run of the conveyor is guided by the idler pulleys 36 and 38.

The upper run of the conveyor is shown in Figure 1 as discharging into the upper flared portion 46 of a hopper 48. The lower end of hopper 48 is shown as provided with a rotary discharge control means 50. Above the lower run 52 of the conveyor are shown a plurality of feed hoppers 53, 54 and 55, these being provided with the rotary discharge control means 57, 58 and 59 respectively. It will be understood that this showing is diagrammatic and that other types of hoppers and feeding means may be used and the location and number of the lower hoppers may be varied as desired.

As shown in Figure 4, the pulleys 13 are provided with inner circularly extending guard members 66 to prevent the material being carried on the inner pulley surfaces and to deflect into the discharge hopper. All of the pulleys 13, 15, 36 and 38 are provided with the radially extending external flanges 68. These flanges serve to engage the outer edges of the belts 20 and to prevent them working laterally of the pulleys. It will be seen in Figure 4 that the dimensions of the arms 24 and the pulley spacing are so related to the width of the buckets that the buckets do not contact the pulleys. Also, the outer ends of arms 24 do not contact the flanges 68.

The individual buckets are each provided with forward walls 70 which incline upwardly and forwardly from the bottom 72. These walls 70 terminate below the line of the connecting arms 24. The rear walls of the buckets are provided with the lowermost short vertically extending sections 74 connected to lower forwardly inclined sections 76 and upper rearwardly inclined sections 78. It will be noted that the wall sections 78 terminate below the upper edges 80 of the side walls 27 of the buckets. The forwardly inclined walls 70 of the buckets are inclined on a greater angle than the rearwardly inclined walls 76 and the upper edge of the forward wall section 70 overlies the forwardly inclined rear section 76 of the adjacent bucket and lies under the rearwardly inclined upper section 78 of the rear wall of the preceding bucket. This relative position of the buckets insures that all material delivered to the lower run of the conveyor falls into the buckets, none of it passing between the buckets.

The buckets 22 are so spaced that no part of one bucket engages an adjacent bucket at any time when passing over pulleys or in straight runs of the conveyor. The arms 24 are of such length that they do not extend entirely across the belts and cannot engage the pulley flanges 68. By using non-metallic belts 20 and countersinking the rivets, there is no metal to metal contact in the conveyor system which serves to eliminate possibilities of creating sparks in the operation of the conveyor. This is important when the conveyor is used in handling grain or malt or other materials which give off dust which may cause an explosion if ignited. Due to the angular relationship of the walls, the buckets not only fill efficiently without loss between buckets but, also, dump cleanly on the upper run of the conveyor.

Referring next to the form of construction shown in Figures 5 to 8 inclusive, the pulleys and general assembly are the same as that used in the construction of Figures 1 to 4. Two parallel belts 85 are used similar to the belts 20. The supporting metal cross members 87 are secured to the belts 20 by the rivets 88. A metal saddle 89 is welded to the center of each cross member 87 and the bucket bodies 91 are welded into their seats in the saddles 89. The body members 91 are U-shaped in cross-section and constitute the backs and sides of the buckets. The bottoms 93 and sloping forward walls 95 of the buckets are preferably formed of a single piece of sheet metal bent as shown and welded to the bucket body 91. It will be noted that the upper edge 97 of the forward wall 95 of the bucket terminates below the upper edge 98 of the body 91, and in the rear of the forward edge 99 thereof.

Each body member 91 is preferably formed with corrugations 101 and 102 running parallel to the upper and lower edges and adjacent these edges. The strips of flexible material 104 connect the top edge of one bucket 91 with the bottom of the next upper bucket. The strips are held to the buckets by metal clamp bands 106 which are corrugated at 107 to correspond to the bucket corrugations 101 and 102. These bands 106 are also shown as provided with elongated depressions 108 to aid in clamping the flexible strips 104 to the buckets. The flexible strips 104 may be made of any suitable material such as natural or synthetic rubber or other plastic material.

Due to the location of the buckets 91 on the saddles 89, which space them inwardly of the arc of the belts 85 in passing around a pulley, there is no tendency to stretch the strips 104 as the buckets 91 tilt relative to each other in passing around the pulley. The material flexes or folds, but does not stretch. In the lower run of the conveyor below the hoppers 53, 54 and 55, the conveyor buckets and their connecting strips form a continuous trough to receive material from the hoppers. On the vertical run, with the buckets as shown in Figure 6, the material drops by gravity into the buckets and is entirely carried by them. On the upper horizontal run, the gravity discharge of the material is quick and clean.

While the conveyors are shown as having short horizontal runs and long vertical runs, it will be understood that the showing is diagrammatic and that they may be adapted for any purpose and that they may be used for conveying material angularly or horizontally, as well as vertically. Any number and arrangement of feed hoppers may be used as desired.

While we have shown certain preferred embodiments of our invention, they are to be understood to be illustrative only as it is capable of variation to meet differing conditions and requirements, and we contemplate such modifications as come within the spirit and scope of the appended claims.

We claim:

1. In a conveyor, a plurality of pulleys, means for driving at least one of said pulleys, a continuous flexible belt extending around said pulleys, and a plurality of closely spaced buckets secured to said belt, said buckets having side, bottom, front and rear walls, the front and rear walls extending forwardly of their line of junction with the bottom, the front wall extending forwardly and upwardly from the bottom and terminating below the top of the sides, the rear wall having a lower portion extending forwardly upon a lesser angle than the front wall and an upper portion inclined rearwardly, the buckets being so spaced on the belts that the upper edge of the front wall of a bucket lies above the lower forwardly extending portion of the rear wall of the adjacent bucket and below the upper rearwardly inclined portion of the rear wall of said bucket.

2. In a conveyor, a plurality of pulleys placed in spaced pairs, spaced parallel continuous belts carried by the pulleys, buckets located between said belts, and arms extending from the buckets and secured to the belts, the buckets having re-entrant angles formed in their rear walls and having forward walls extending into the re-entrant angle of the rear wall of the adjacent bucket.

3. In a conveyor, a plurality of pulleys placed in spaced pairs, spaced parallel continuous belts carried by the pulleys, buckets located between said belts, and arms extending from the buckets and secured to the belts, the buckets having re-entrant angles formed in their rear walls and having forward walls extending into the re-entrant angle of the rear wall of the adjacent bucket, the tops of the buckets being open to provide a continuous material receiving area in a lower horizontal run of the conveyor.

WILHELM A. MELCHIOR.
ALAN R. GRAFF.

References Cited in the file of this patent

UNITED STATES PATENTS

| Number | Name | Date |
|---|---|---|
| 283,894 | Kearns | Aug. 28, 1883 |
| 565,334 | Dodge | Aug. 4, 1896 |
| 684,618 | Schmidt | Oct. 15, 1901 |
| 748,551 | Wilfley | Dec. 29, 1903 |
| 765,069 | Dodge | July 12, 1904 |
| 776,980 | Altmann | Dec. 6, 1904 |
| 1,106,146 | Higgins | Aug. 4, 1914 |
| 2,318,658 | Alvey | May 11, 1943 |
| 2,339,069 | Gemeny | Jan. 11, 1944 |
| 2,339,938 | Meyer | Jan. 25, 1944 |
| 2,405,378 | Thomas | Aug. 6, 1946 |